(12) United States Patent
Kraus (10) Patent No.: US 7,609,016 B2
(45) Date of Patent: Oct. 27, 2009

(54) SYSTEMS AND METHODS FOR DRIVING A MOTOR

(75) Inventor: Richard Alan Kraus, Farmington Hills, MI (US)

(73) Assignee: Infineon Technologies AG, Munich (DE)

(*) Notice: Subject to any disclaimer, the term of this patent is extended or adjusted under 35 U.S.C. 154(b) by 246 days.

(21) Appl. No.: 11/360,175

(22) Filed: Feb. 23, 2006

(65) Prior Publication Data
US 2007/0194729 A1    Aug. 23, 2007

(51) Int. Cl.
*H02P 1/04* (2006.01)
(52) U.S. Cl. ............... 318/430; 388/815; 318/400.1; 318/400.13; 318/400.27; 318/400.28; 318/672
(58) Field of Classification Search ........... 318/254, 318/139, 672, 689, 696, 800, 801, 362, 430, 318/432, 434, 437, 443, 445, 599, 120, 700, 318/400.01, 400.1, 400.17, 400.26, 400.27, 318/400.28, 400.29, 400.13; 326/35, 36, 326/68; 388/815
See application file for complete search history.

(56) References Cited

U.S. PATENT DOCUMENTS

| | | | | |
|---|---|---|---|---|
| 4,247,818 A * | 1/1981 | Hiroshima et al. | ........... | 324/202 |
| 4,501,284 A * | 2/1985 | Kuno et al. | ................ | 123/352 |
| 4,565,957 A * | 1/1986 | Gary et al. | ................ | 318/723 |
| 4,955,291 A * | 9/1990 | Dillon et al. | ............... | 104/299 |
| 5,170,514 A * | 12/1992 | Weigert | ................. | 4/313 |
| 5,454,114 A | 9/1995 | Yach et al. | | |
| 5,486,747 A | 1/1996 | Welch | | |
| 5,528,444 A * | 6/1996 | Cooke et al. | ................ | 361/20 |
| 5,570,276 A * | 10/1996 | Cuk et al. | .................... | 363/16 |
| 5,668,477 A * | 9/1997 | Mahmoudian et al. | ...... | 324/613 |
| 5,990,640 A * | 11/1999 | Dwyer et al. | .......... | 318/400.29 |
| 6,215,261 B1 * | 4/2001 | Becerra | ................. | 318/400.26 |
| 6,548,983 B2 * | 4/2003 | Avella et al. | ............... | 318/599 |
| 6,833,990 B2 | 12/2004 | LaCroix et al. | | |
| 6,998,801 B2 * | 2/2006 | Kurosawa et al. | ...... | 318/400.27 |
| 7,019,991 B2 * | 3/2006 | Yamashita | ................. | 363/52 |
| 7,206,179 B2 * | 4/2007 | Miyamoto | ................. | 361/118 |
| 7,208,918 B2 * | 4/2007 | Shirakawa et al. | ........... | 322/99 |
| 7,372,233 B2 * | 5/2008 | Albayrak et al. | ........... | 318/812 |
| 2004/0027083 A1 * | 2/2004 | Suzuki | ....................... | 318/434 |

OTHER PUBLICATIONS

BTS 7960 "High Current PN Half Bridge NovalithIC™"43 A, 7 mΩ+9 mΩ, Automotive Power, Infineon Technologies, Data Sheet, Rev. 1.1, Dec. 2004, 28 pgs.

* cited by examiner

*Primary Examiner*—Bentsu Ro
*Assistant Examiner*—Antony M Paul
(74) *Attorney, Agent, or Firm*—Eschweiler & Associates, LLC (57) ABSTRACT

A control system includes a controller configured to provide a drive signal, and a switching device configured to generate an output control signal as a function of the drive signal in an on-state mode of operation. The control system also includes a timing network configured to receive the drive signal and output a gated signal to the switching device, wherein the gated signal maintains a relationship with a predetermined threshold during the on-state of operation of the switching device.

15 Claims, 7 Drawing Sheets

SYSTEMS AND METHODS FOR DRIVING A MOTOR

FIELD OF THE INVENTION

The present invention relates generally to a system and method for driving a motor via a half-bridge. More particularly, the present invention relates to a system and method for driving a motor wherein the half bridge is coupled to a controlling device via a limited connection and/or drive signal.

BACKGROUND OF THE INVENTION

The sophistication of today's automobiles continues to increase, a trend driven by an ever-expanding suite of electronic control subsystems. As the number of electronic control subsystems increases, their integration is becoming a serious challenge for automakers. Generally, each subsystem is connected to other vehicle systems by way of one or more electrical connections (e.g., wires). Automakers generally would like to limit the number of connections between subsystems, because such connections adversely affect an automaker's bottom line in at least two ways: (1) as the complexity of the interconnect increases, more man-hours are required for design; and (2) the physical connections themselves cost money. Thus, by limiting the number of connections between subsystems, automakers can deliver products that are more cost-competitive.

Of particular importance in automotive applications are so called current switches such as half-bridge current switches. In short, current switches are sometimes employed to drive motors by changing the current to the motor, which in turn changes the electrical flux near the motor to drive the motor's rotation. Of course, like many other electronic control subsystems, existing current switches generally require several inputs to operate properly. Thus, existing current switches require several wires or other connections to connect to other vehicle subsystems. These connections are costly, especially given that current switches are typically located in densely packed and valuable vehicle locations.

SUMMARY OF THE INVENTION

One embodiment of the invention includes a control system with a controller configured to provide a drive signal, and a switching device configured to generate an output control signal as a function of the drive signal in an on-state mode of operation. The control system also includes a timing network configured to receive the drive signal and output a gated signal to the switching device, wherein the gated signal maintains a relationship with a predetermined threshold during the on-state of operation of the switching device.

DETAILED DESCRIPTION OF THE INVENTION

The present invention will now be described with respect to the accompanying drawings in which like numbered elements represent like parts. The figures and the accompanying description of the figures are provided for illustrative purposes.

Figure 1:
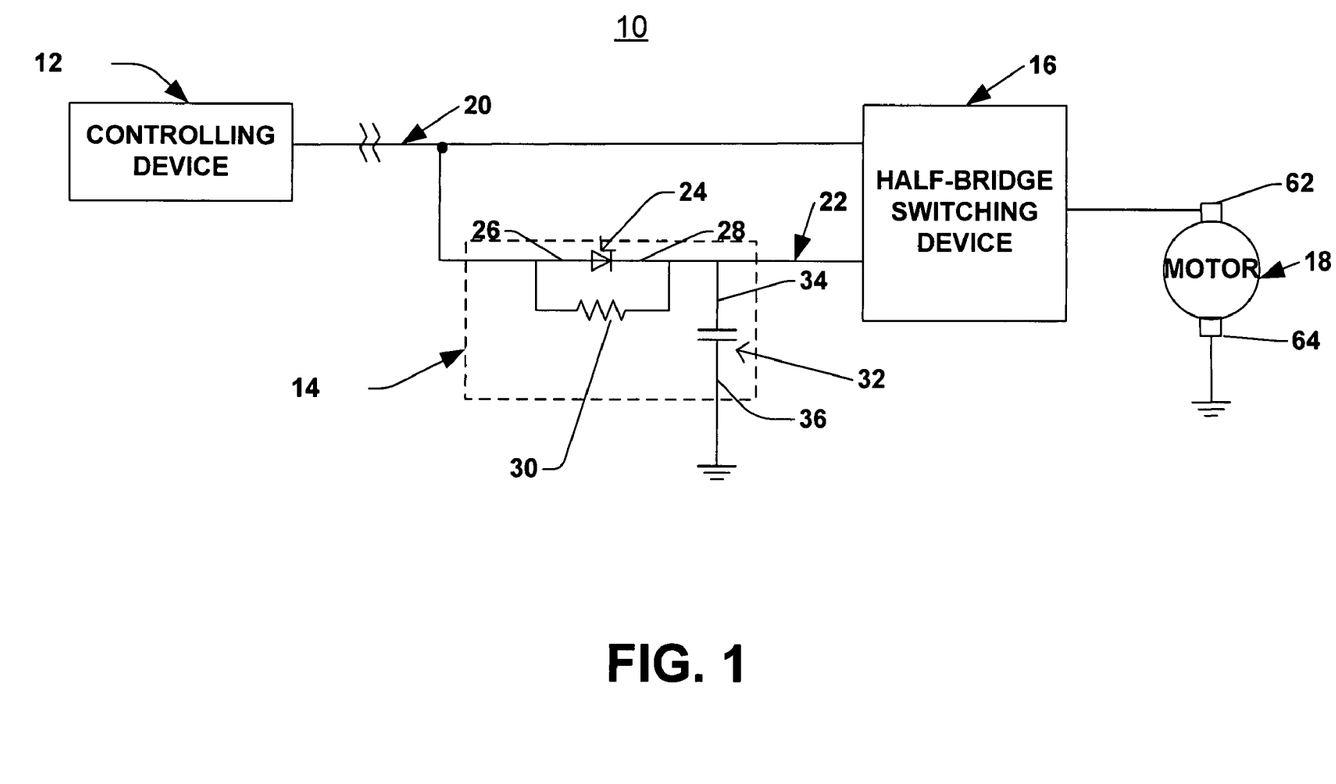
FIG. 1 is a schematic diagram illustrating one embodiment of a system for driving a motor.

As shown in the illustrated embodiment in FIG. 1, aspects of the present invention relate to a system 10 for driving a motor. Generally the system 10 may include a controlling device 12, a timing network 14, and a half bridge switching device 16, which are operably coupled together to drive a motor 18.

The controlling device 12 may be any device that is capable of providing a drive signal that can be utilized by the timing network 14 and the half-bridge switching device 16. In various embodiments, the controlling device 12 may typically include a logical engine for generating a drive signal; the term "logical engine" includes, but is not limited to: microprocessor(s), FPGA(s), PLA(s), ASIC(s), or DSP(s). The controlling device 12 may also include additional components including, but not limited to: biasing circuits, band-gaps, current mirrors, current sinks, filters, and/or discrete analog or digital devices. If present, these additional components may help ensure that the controlling device 12 provides a drive signal that the timing network 14 and half-bridge switching device 16 can utilize. In other embodiments, switching device 16 can be any suitable switching device other than a half-bridge switching device.

Referring again to the illustrated embodiment in FIG. 1, one can see that the timing network 14 may receive the drive signal via a primary electrical connection 20, and that the timing network 14 may provide a gated signal via a secondary electrical connection 22. In various embodiments, the timing network 14 can include one or more circuits and/or discrete devices that transform the drive signal into the gated signal. For example, FIG. 1 illustrates one embodiment of a timing network 14 that includes a diode 24 having a first node 26 coupled to the primary electrical connection 20 and a second node 28 coupled to the secondary electrical connection 22; a resistor 30 in parallel with the diode 24; and a capacitor 32 having a first node 34 coupled to the secondary electrical connection 22 and a second node 36 coupled to ground. In various embodiments, values for the resistance of resistor 30 can range from about 20 kΩ to about 100 kΩ. In one embodiment, the value of resistor 30 is 100 kΩ. In various embodiments, values for the capacitance of capacitor 32 can range from about 0.001 µF to about 0.1 fF. In one embodiment, the value of capacitor 32 is 10 nF. In other embodiments, other suitable values can be used for the values of resistor 30 and capacitor 32.

In the illustrated embodiment, the half-bridge switching device 16 is coupled to the primary electrical connection at 20 and the secondary electrical connection at 22. Through the connections at 20 and 22, the half-bridge switching device 16 receives both the drive signal and gated signal. In various embodiments, the half-bridge switching device 16 accommodates load switching and pulse width, modulation in excess of a predetermined frequency. In various embodiments, the predetermined frequency may be a supersonic frequency above 15 kHz. In one embodiment, the predetermined frequency is 20 kHz. In other embodiments, the predetermined frequency can be other suitable values.

Figure 2:
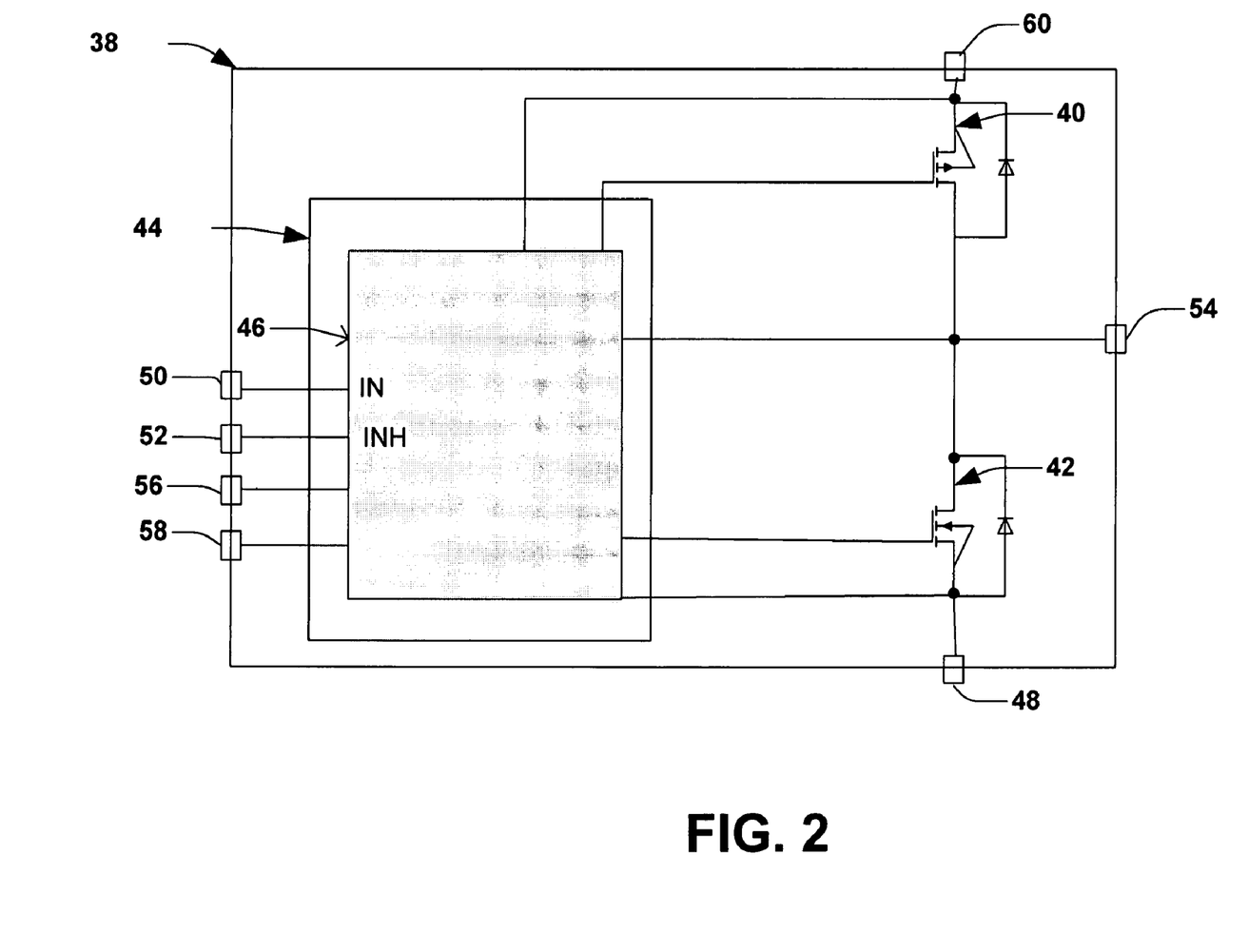
FIG. 2 is a block diagram illustrating one embodiment of a half-bridge switching device.

FIG. 2 is a block diagram illustrating one embodiment of a half-bridge switching device. The half bridge switching device is illustrated at 38. In this embodiment, the half bridge switching device 38 is a high current half bridge for motor drive applications. In other embodiments, the half bridge switching device can be used for other suitable applications. In the illustrated embodiment, the half bridge switching device includes a p-channel high side MOSFET 40 (HSS 40), an n-channel low side MOSFET 42 (LSS 42) and an integrated driver 44. The half bridge switching device 38 has signal inputs and outputs that include GND 48, which is ground, IN 50 which defines whether the HSS 40 switch or the LSS 42 switch is activated, INH 52 which when set to low puts the BTS 7960 into a sleep mode, OUT 54 which is the power output of the half bridge switching device 38, SR 56 which is for adjusting the slew rate by connecting a resistor between SR and GND, IS 58 which is an output for current sense and diagnosis and that defines whether the HSS 40 switch or the LSS 42 switch is activated, and VS 60 which is a voltage supply input. In other embodiments, other suitable inputs or outputs can be used.

In the illustrated embodiment, half bridge switching device 38 operates in accordance with the following truth table:

| Device State | Input | | Outputs | | | |
| --- | --- | --- | --- | --- | --- | --- |
| | INH | IN | HSS | LSS | IS | Mode |
| Normal Operation | 0 | X | OFF | OFF | 0 | Stand-by |
| | 1 | 0 | OFF | ON | 0 | LSS active |
| | 1 | 1 | ON | OFF | CS | HSS active |

Referring again to FIG. 1, the illustrated embodiment includes a motor 18. The motor 18 generally has a first terminal 62 that is coupled to the output of the half-bridge switching device, and a second terminal 64 coupled to ground. In one embodiment, the motor 18 is a brush-commutated motor that is operated in continuous current mode.

In various embodiments, the half-bridge switching device 16 may be positioned in relation to the timing network 14 in one of several ways, including but not limited to: the timing network may be integrated into the same integrated circuit as the half-bridge switch; the timing network may share a package with the half-bridge switch; the timing network may share a circuit board with the half-bridge switch; the timing network may be located locally or near to the half-bridge switch; or the timing network may be otherwise positioned with the half-bridge switch.

In various automotive embodiments, the location of the motor 18, the half-bridge switching device 16 and timing network 14 are in a very dense and/or valuable vehicle location. Moreover, in various embodiments, the motor 18, the half-bridge switching device 16 and the timing network 14 may be localized together. For example, because of space concerns, the half-bridge switching device 16, timing network 14, and all other necessary components may be located on, near, or adjacent to the motor 18 or the motor housing. Furthermore, because of space concerns, in one embodiment the controlling device 12 is located in a remote location relative to each of the motor 18, half-bridge switching device 16, and timing network 14. In one embodiment, the controlling device 12 is coupled to both the half-bridge switching device 16 and the timing network 14 via a single electrical connection.

In the illustrated embodiment of FIG. 1, the primary electrical connection 20 that couples the controlling device 12 to both the half-bridge switching device 16 and the timing network 14 may be a single primary electrical connection. In various embodiments, the term "single primary electrical connection" or "single electrical connection" may include, but is not limited to: one and only one wire to carry one or more signals; one and only one conductive conduit to carry one or more signals; one wire or one conductive conduit coupled to at least one of: a wire, conduit, harness, or other electrical connector, so as to carry one or more signals; or a wire or a conduit coupled to one or more electrical connectors so as to carry one or more signals. In other embodiments, the primary electrical connection 20 can include more than one wire to carry one or more signals and more than one conductive conduit to carry one or more signals. In other embodiments, the primary electrical connection 20 is a wireless connection using any suitable frequency for communication. In various typical embodiments, "single primary electrical connection" or "single electrical connection" relates to an electrical length. In various automotive embodiments, the electrical length may be greater than about 0.2 meters, greater than about 1 meter, greater than about 2 meters, or even greater than about 4 meters. In a particular embodiment, the electrical length is greater than about 0.2 meters. In various embodiments, the electrical length between control and actuator is within the range of 1 to 4 meters.

Figure 3:
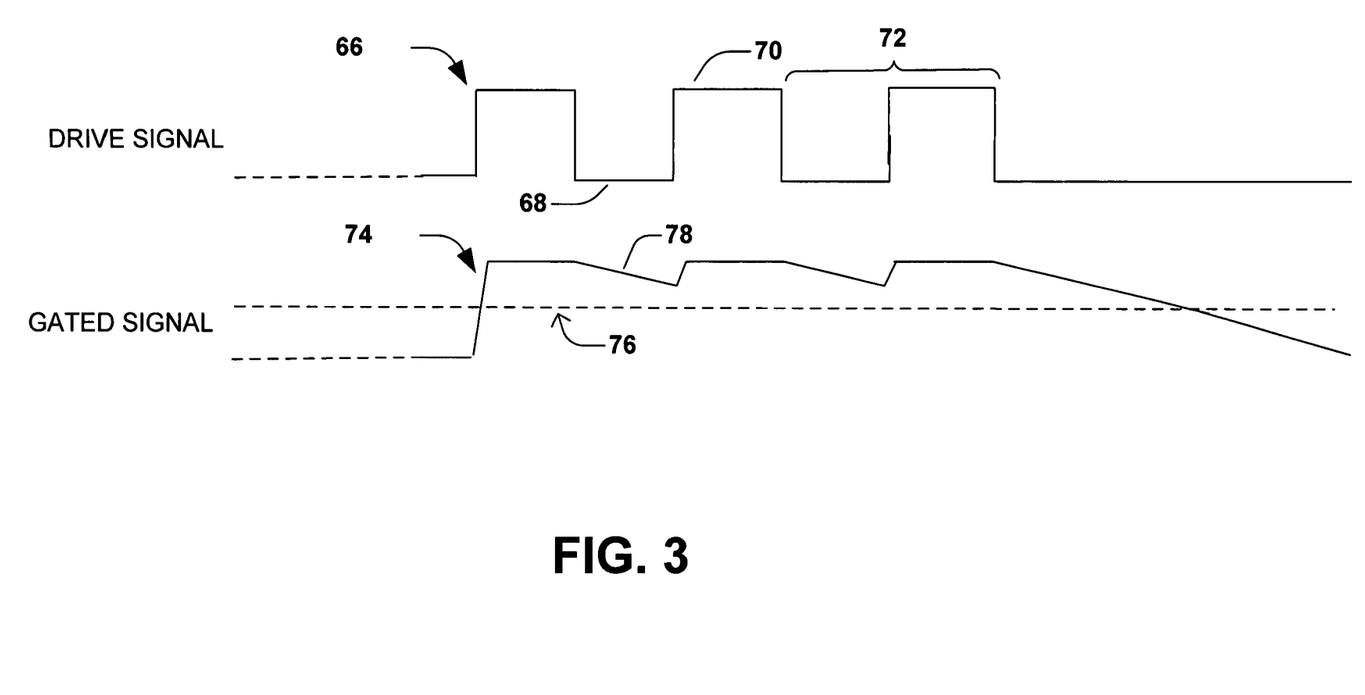
FIG. 3 is a timing diagram illustrating timing characteristics for one embodiment of a system for driving a motor.

As previously mentioned, the drive signal may be transmitted along the primary electrical connection 20. Referring briefly to FIG. 3, one can see that in various embodiments, the drive signal 66 may have a drive cycle that varies between a first state 68 and a second state 70. One can also see that gated signal 74 (which may be transmitted along secondary electrical connection 22 of FIG. 1) may take more than one period of the drive signal 66 to drop below a predetermined threshold 76. During normal operating mode, if the gated signal 74 stays above the predetermined threshold 76, then the half-bridge switching device 16 is "ON" and supplies a high-side current or a low-side current to drive the motor 18. If, however, the gated signal 74 goes below the predetermined threshold 76, then the half-bridge switching device 16 enters an inhibit mode or sleep state and no longer supplies a significant current to drive the motor 18. Thus, as shown in FIG. 3's illustrated embodiment, when the drive signal 66 goes low for an extended period of time, the gated signal 74 likely falls below the threshold 76, thereby triggering the inhibit or sleep mode of the half-bridge switching device 16.

In one embodiment, one period 72 of the drive cycle may range from approximately 66 μs to approximately 33 μs. In a particular embodiment, the drive cycle can be operated up to a frequency of approximately 25 kHz, which corresponds to a period of approximately 40 microseconds. In various embodiments, the first state 68 and the second state 70 may vary by as much as approximately 5 volts; in other embodiments, the first state 68 and the second state 70 may vary by as little as approximately 1.75 volts. In one embodiment, the drive signal's second state and first state vary by approximately 5 volts.

In the illustrated embodiment, the gated signal 74 includes a decay region 78. As it relates to the embodiment in FIG. 1, the characteristics of the decay region 78 are determined by the RC time constant associated with timing network (and in particular diode 24, resistor 30 and capacitor 32.) For example, when the drive signal 66 enters the first state (e.g., goes high), the gated signal 74 tracks the drive signal closely (e.g., rises quickly). This behavior occurs because diode 24 is-forward biased and capacitor 32 charges quickly, causing a fast rise-time for gated signal 74. So long as the drive signal 66 remains high, the gated signal 74 also remains high. However, when the drive signal 66 transitions to the second state 68 (e.g., goes low), charge leaks from capacitor 32, causing the voltage of the gated signal to drop in the decay region 78. Thus, one can see that in the illustrated embodiment in FIG. 1, one can adjust the characteristics of the decay region 78 by adjusting the values of capacitor 32 and resistor 30. Thus, one can adjust the time required for the gated signal 74 to drop below the predetermined threshold 76.

As FIG. 3 shows, the timing network 14 may be engineered such that the gated signal 74 (which may be transmitted along secondary electrical connection 22 of FIG. 1) takes more than one period of the drive signal 66 to drop below a predetermined threshold 76 by which the half-bridge current switching device is placed into an inhibit mode or sleep state. More precisely, the decay region of the gated signal may be engineered to cross a predetermined threshold at a predetermined time to place the current switching device in inhibit mode or sleep mode. In particular embodiments, the predetermined threshold 76 corresponds to an operational threshold of the half-bridge switching device 16. For example, in one embodiment, for half bridge switching device 38, the INH pin 52 is an inhibit pin. When the INH pin 52 is low, the half bridge switching device 38 goes into standby mode and draws a nominal amount of current (e.g., in one embodiment less than 100 micro-amps, or less than 15 micro-amps) to minimize battery drain. Only when the inhibit pin is high is the half bridge switching device 38 in an active mode (see truth table above). When in active mode, if the IN pin 50 is low, then the LSS 42 switch is active. When in active mode, if the IN pin 50 is high, then the HSS 40 switch is active. Thus, in embodiments using the half bridge switching device 38, one can tie the drive signal to the IN pin 50 and the timing network 14. Such an arrangement provides a gated signal 74 that can be tied to the INH pin 52.

Figure 4:
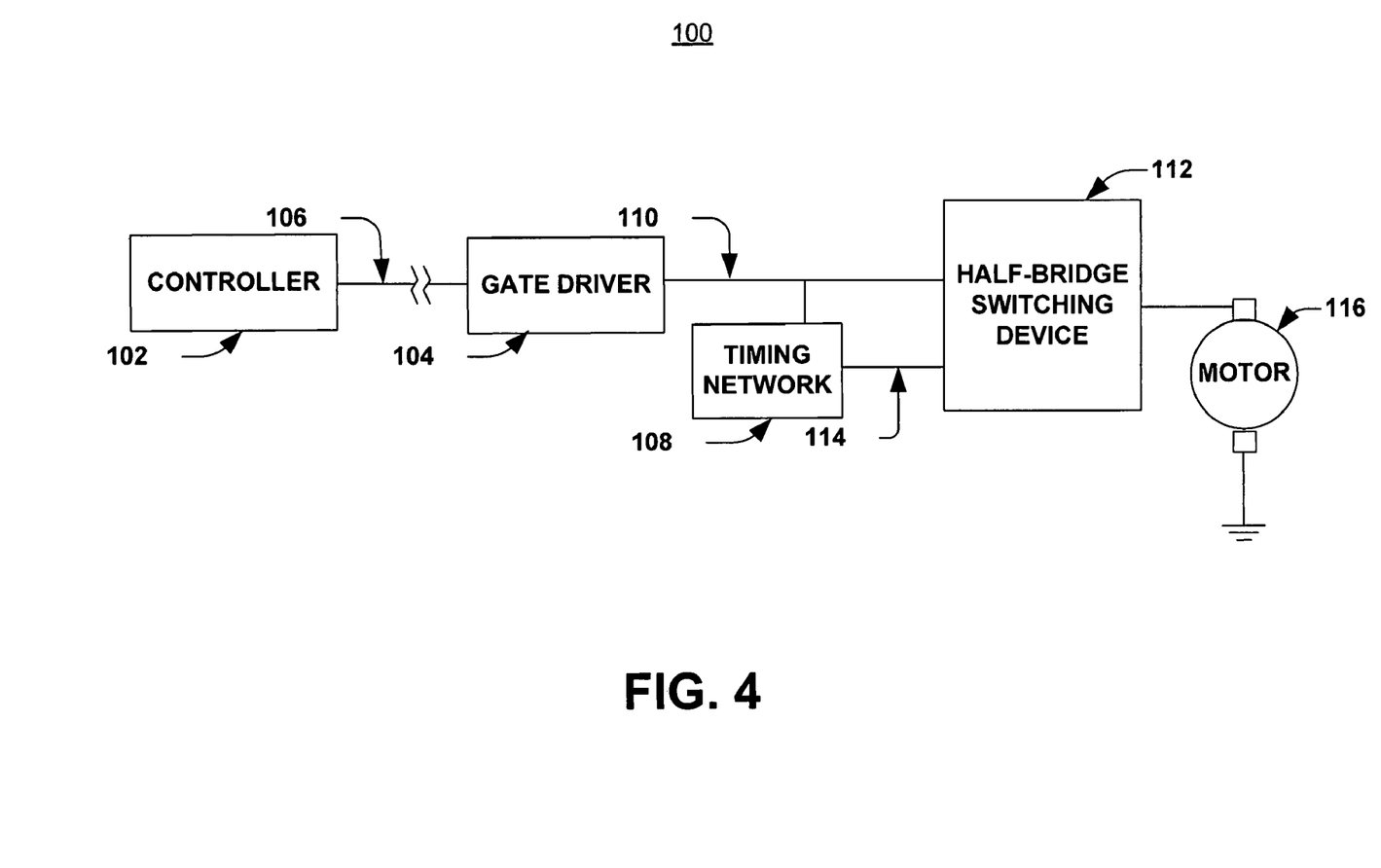
FIG. 4 is a block diagram illustrating one embodiment of a system for driving a motor.

Referring now to FIG. 4, one embodiment of a system for driving a motor is illustrated. This embodiment illustrated at 100 includes a controller 102 that is coupled to a gate driver 104 via an electrical connection 106; a timing network 108 that is coupled to the gate driver 104 via a modified drive signal 110; a half-bridge switching device 112 that is coupled to-both the gate driver 104 and timing network 108 via a modified drive signal 110 and a gated signal 114, respectively; all of which are coupled together to drive a motor 116. In this embodiment, the controller 102 may be coupled to the gate driver 104 via a single electrical connection.

Figure 5:
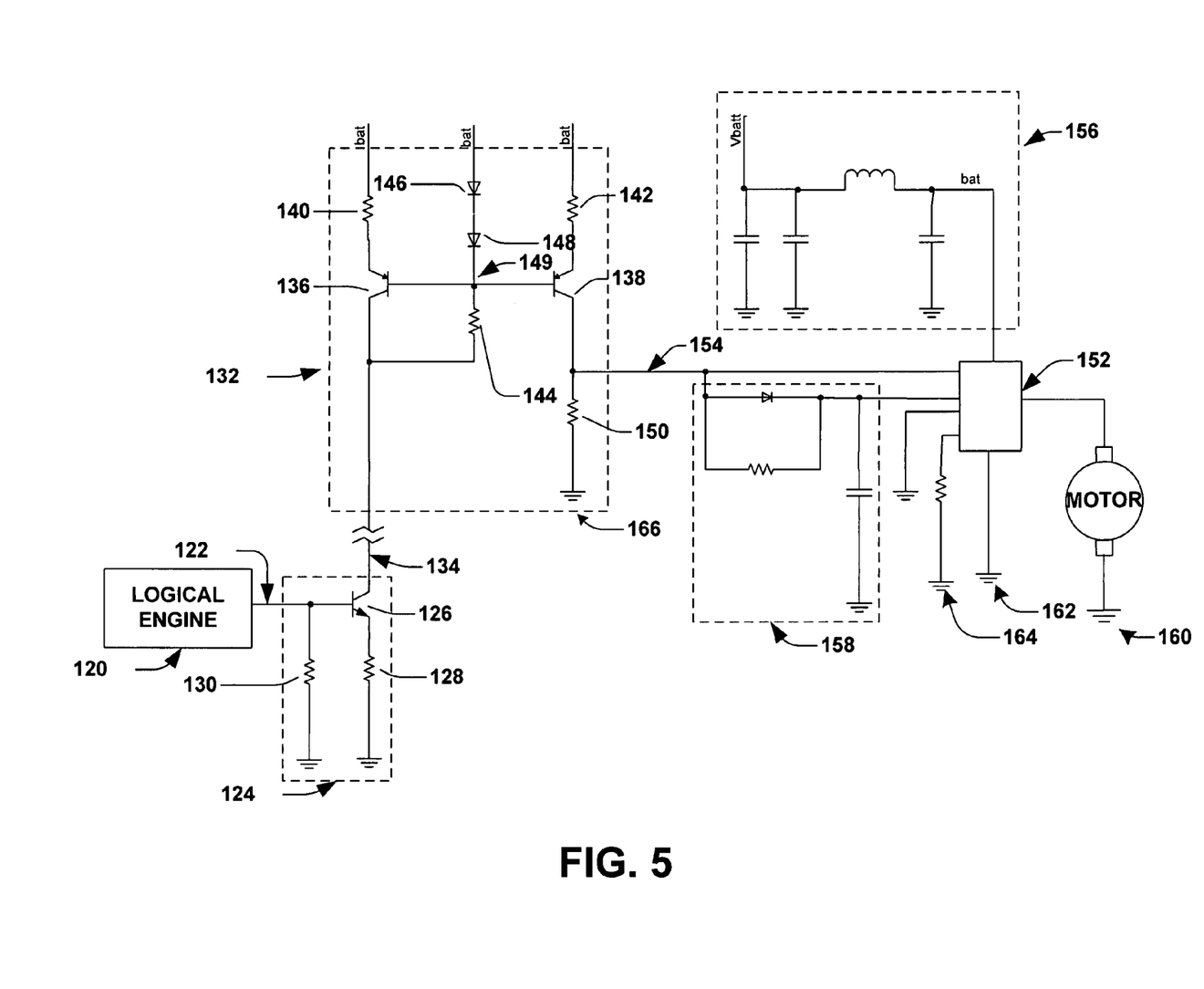
FIG. 5 is a schematic diagram illustrating one embodiment of a system for driving a motor.

Referring now to FIG. 5, another embodiment of a system for driving a motor is illustrated. This embodiment illustrates includes a logical engine 120 that provides a digital signal 122. In various embodiments, the digital signal 122 has a voltage range of approximately 5 volts.

Still referring to the illustrated embodiment of FIG. 5, the current sink 124 receives the digital signal 122. Briefly, if a short circuit occurs, a current sink 124 aids in limiting the maximum current that enters the logical engine 120. Transistor 126 is driven by the digital signal 122. When the digital signal 122 goes to a logical one, resistor 128 limits the current through transistor 126. Current sink 124 includes transistor 126, resistor 128, and resistor 130.

In the illustrated embodiment, the current sink 124 is coupled to the gate driver 132 via a single electrical connection 134. In short, the gate driver 132 establishes drive currents for the half-bridge current switching device 152. In FIG. 5's illustrated embodiment, the gate driver 132 is a current mirror. The current mirror comprises transistor 136, transistor 138, resistor 140, and resistor 142. Current leaving the collector of transistor 138 is converted to a voltage via the resistor 150 provided at primary electrical connection 154. Resistor 144, diode 146, and diode 148 form a biasing clamp 149 to prevent transistor 136 and transistor 138 from passing too much current and possibly damaging half-bridge switch 152. In the case of a short circuit, the biasing clamp would limit the maximum current. Resistor 150 develops a voltage on primary electrical connection 154. The primary electrical connection 154 connects to both timing network 158 and half-bridge current switch 152.

FIG. 5's illustrated embodiment also includes an input filter 156. If present, the input filter 156 may be coupled to an automobile's battery and filters noise voltage that the battery provides. In automotive embodiments, in particular, large current and/or voltage requirements may cause the battery voltage to have significant ripple. For example, a typically automotive battery may provide a voltage of 14.2 V to the automotive electrical subsystems on node "Vat." Because of the significant electrical stresses associated with a vehicle's operation, this "Vat" node may have a ripple of about 1 to about 1.5 V. The input filter 156 aims to minimize the ripple.

As an added safeguard to minimize ripple, FIG. 5's illustrated embodiment limits the effect of ground offset. Even with the use of the input filter 156, the motor and other components may still cause a voltage drop between true ground and various components. In order to further minimize the effect of ground offset, grounds (160, 162, 164, and 166) may be connected near one another on the chassis ground. In such an embodiment where the grounds (160, 162, 164 and 166) are connected near one another on the chassis ground, the grounds (160, 162, 164, and 166) will bounce together such that ground offset is minimized. In effect, the various portions of the circuit will still remain relative to the same ground even though the ground is, in reality, varying because of the motor of other vehicle demands.

Figure 6:
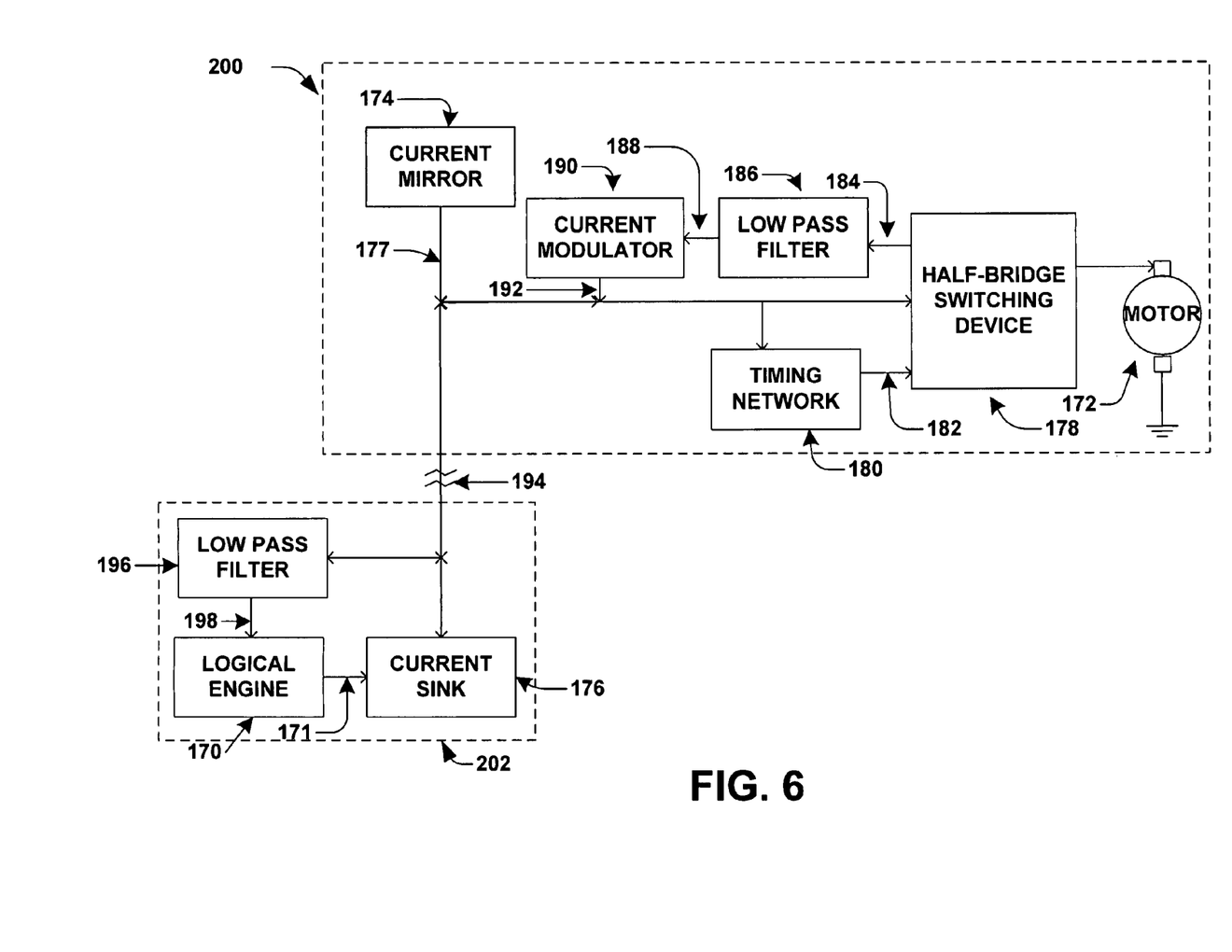
FIG. 6 is a block diagram illustrating one embodiment of a system for driving a motor.

FIG. 6 illustrates one embodiment of a system for driving a motor. This illustrated embodiment is directed towards a closed loop motor control system. In this embodiment, a logical engine 170 provides for a digital signal 171 and controls the speed of the motor 172 by varying the Pulse Width Modulation (PWM), and the system includes means for relaying motor speed data back to the logical engine 172 on the same electrical connection.

In the illustrated embodiment, logical engine 170 controls current mirror 174 and current sink 176, which drive a current. The current mirror 174 provides an electrical signal 177 to both the half-bridge switching device 178 and the timing network 180. Timing network provides a gated signal 182 to the half-bridge switching device 178. The half-bridge switching device 178 applies a current that drives the motor 172. The half-bridge switching device 178 also provides a current sense signal 184. The current sense signal 184 enters a low pass filter 186 and becomes a filtered current sense signal 188. The filtered current sense signal 188 then enters the current modulator 190 and becomes a modulated output signal 192. This modulated output signal 192 is applied to the common node 194 between the current mirror 174 and current sink 176. The additional low pass filter 196 decouples the low frequency current from the high frequency current, and provides the low frequency components 198 (which relate to the current sense signal 184) to the logical engine 170 for processing. Having obtained the low frequency components that are representative of the current sense signal 184 in the half-bridge switching device 178, the present system can regulate the motor speed in a closed loop control system.

In FIG. 6's illustrated embodiment, local components 200 may include current mirror 174, current modulator 190, low pass filter 186, timing network 180, and half-bridge switching device 178. For example, because of space concerns, the local components 200 and all other necessary components may be located on, near, or adjacent to the motor 172 or the motor housing. Furthermore, because of space concerns, the remote components 202 may include logical engine 170, current sink 176, and additional low pass filter 196. The remote components 202 may be located together on a microboard, and are generally located in a remote location relative to the local components 200. In general, the local components 200 are coupled to the remote components 202 via a single electrical connection 194.

Figure 7:
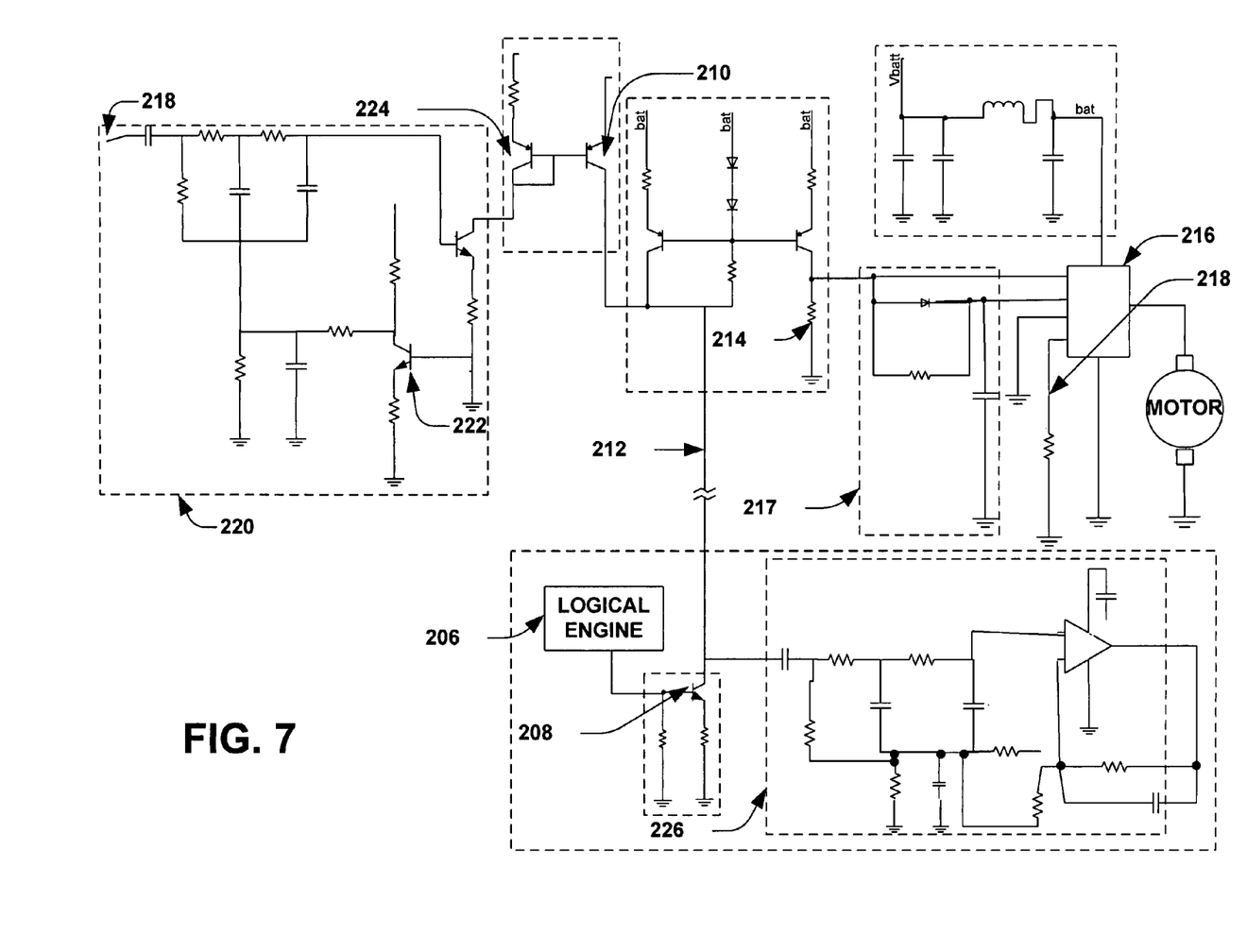
FIG. 7 illustrates one embodiment of a circuit to implement a closed loop motor control system.

FIG. 7 illustrates one embodiment of a circuit to implement a closed loop motor control system. This circuit works as follows. The logical engine 206 provides a PWM signal to the base of transistor 208, which is the lower half of a current mirror. A current is then sunk through the collector of transistor 210 and is sourced from a common node 212 that is connected to the upper portion of the current mirror. The current mirror drives a resistor 214. Resistor 214 converts the current to a voltage, and applies the voltage to various pins of the half-bridge current switch 216 as well as the timing network 217. Thus, the logical engine 206 has control of the half-bridge current switch 216.

In a particular embodiment, the half-bridge current switch 216 provides a current sense output signal 218 that relates to the current that the motor is sourcing. The current sense output signal 218 can be an AC output, a DC output, or some combination of AC and DC. The current sense output signal 218 passes through a low pass filter 220 to transistor 222. Transistor 222 is a self-biasing current sink. The quiescent operating point of the current sink is "disturbed" by the current sense output signal 218. The current sense output signal 218 is converted to sink current and is reflected by transistor 224. Transistor 224 is then connected to the single electrical connection 212. Current disturbances on the single electrical connection 212 are directly proportional to the voltage of the current sense output signal 218.

A low pass filter and amplifier 226 attached to the single electrical connection 212 allows the logical engine 206 to receive the current sense output signal 218. The logical engine 206 may receive the current sense output signal 218 directly, gated, or simply amplified. In FIG. 6's illustrated embodiment, an active low pass filter 226 is constructed from non-premium components. The arrangement in the illustrated embodiment includes an input low pass filter and a sense biased amplifier.

Although the invention has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A control system, comprising:
    a controller configured to provide a drive signal having a period associated therewith;
    a switching device configured to generate an output control signal as a function of the drive signal in an on-state mode of operation; and
    a timing network configured to receive the drive signal and output a gated signal to the switching device, wherein, when the drive signal is asserted, the gated signal maintains a relationship with a predetermined threshold to enable the switching device to alternate between a high-side current state of operation and a low-side current state of operation; and
    wherein, when the drive signal is continuously de-asserted for more than one period, the gated signal decays to maintain another, different relationship with the predetermined threshold.

2. The control system of claim 1, wherein the relationship comprises the gated signal maintaining a voltage level above the predetermined threshold to enable the switching device to alternate between the high-current state and the low-current state, and where the another, different relationship comprises the gated signal maintaining a voltage level below the predetermined threshold to put the switching device into a sleep-state of operation.

3. A system for driving a motor, comprising:
    a controlling device configured to provide a drive signal having a drive cycle;
    a timing network configured to receive the drive signal and generate a gated signal as a function of the drive signal; and
    a switching device having an operational threshold and configured to receive both the drive signal and the gated signal; wherein, when the drive signal is asserted, the gated signal enables the switching device to deliver a high-side current and a low-side current as a function of the drive signal; and wherein, when the drive signal is continuously de-asserted for more than one drive cycle, the gated signal disables significant current from the switching device;
    wherein the controlling device is coupled to both the switching device and the timing network via a single primary electrical connection.

4. The system of claim 3, wherein an electrical length of greater than about 0.2 meters separates the controlling device from the timing network and switching device, and wherein the single primary electrical connection spans the electrical length.

5. The system of claim 3, wherein the timing network comprises:
    a diode;
    a resistor in parallel with the diode; and
    a capacitor located such that the gated signal takes more than one period of the drive cycle to drop below the operating threshold of the switching device.

6. A method for driving a motor with a current switching device, comprising:
    receiving a drive signal at the current switching device, wherein the current switching device drives the motor in response thereto, wherein the drive signal comprises a pulse width modulation signal associated with a period and comprising a first state and a second state during an on-state of the motor; and
    processing the drive signal with a timing network to generate a gated signal with a decay region, the decay region starting at an initial de-assertion of the drive signal during the on-state of the motor and engineered to cross a predetermined threshold at a predetermined time that is multiple periods removed from the de-assertion to place the current switching device in an off-state during an off-state of the motor.

7. The method of claim 6, further comprising providing the drive signal via a controlling device.

8. The method of claim 7, further comprising coupling the controlling device to both the timing network and the current switching device via a single electrical connection.

9. The method of claim 7, further comprising coupling the controlling device to both the timing network and the current switching device via a single drive signal.

10. The method of claim 7, wherein the step of providing a timing network further comprises:
    providing a diode;
    providing a resistor in parallel with the diode; and
    providing a capacitor located such that the gated signal takes more than one cycle of the drive cycle to drop below an operating threshold of the current switching device.

11. A high current half-bridge, comprising:
    a controller configured to provide a drive signal having a period associated therewith;
    a p-channel high-side metal oxide semiconductor field effect transistor for providing a high-side current and voltage;
    an n-channel low-side metal oxide semiconductor field effect transistor for providing a low-side current and voltage;
    a driver integrated circuit for selectively control the p-channel high-side metal oxide semiconductor field effect transistor and the n-channel low-side metal oxide semiconductor field effect transistor during an on-state as a function of the drive signal, and
    a timing network for providing a gated signal to the driver integrated circuit as a function of the drive signal, where the drive signal, when asserted, puts the driver integrated circuit in the on-state, and where the drive signal, when continuously de-asserted for multiple periods, puts the driver integrated circuit in an off-state.

12. The high current half-bridge of claim 11, wherein the p-channel high-side metal oxide semiconductor field effect transistor, the n-channel low-side metal oxide semiconductor field effect transistor, the driver integrated circuit, and timing network are fully integrated in a single integrated circuit.

13. The high current half-bridge of claim 11, wherein the timing network comprises:
    a diode;
    a resistor in parallel with the diode; and
    a capacitor located such that the gated signal takes more than one cycle of the drive cycle to drop below an operating threshold of the half-bridge switching device.

14. The high current half-bridge of claim 13, wherein the timing network comprises a diode having a first node coupled to a primary electrical connection and a second node coupled to a secondary electrical connection; a resistor in parallel with the diode; and a capacitor having a first node coupled to the secondary electrical connection and a second node coupled to ground; and
    wherein the driver integrated circuit has a first pin coupled to the primary electrical connection and has a second pin coupled to the secondary electrical connection.

15. The high current half-bridge of claim 14, wherein the p-channel high-side metal oxide semiconductor field effect transistor, the n-channel low-side metal oxide semiconductor field effect transistor, the driver integrated circuit, and timing network are fully integrated in a single integrated circuit.

* * * * *